US010736028B2

(12) United States Patent
Griot et al.

(10) Patent No.: US 10,736,028 B2
(45) Date of Patent: Aug. 4, 2020

(54) NETWORK SERVICE CONFIGURATION AND SELECTION USING NETWORK SLICES

(71) Applicant: QUALCOMM Incorporated, San Diego, CA (US)

(72) Inventors: Miguel Griot, La Jolla, CA (US); Gavin Bernard Horn, La Jolla, CA (US); John Nasielski, San Diego, CA (US); Santosh Abraham, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 20 days.

(21) Appl. No.: 15/922,897

(22) Filed: Mar. 15, 2018

(65) Prior Publication Data

US 2018/0270744 A1 Sep. 20, 2018

Related U.S. Application Data

(60) Provisional application No. 62/474,007, filed on Mar. 20, 2017.

(51) Int. Cl.
| | |
|---|---|
| *H04W 48/18* | (2009.01) |
| *H04W 88/18* | (2009.01) |
| *H04W 4/00* | (2018.01) |
| *H04W 4/30* | (2018.01) |
| *H04W 88/06* | (2009.01) |
| *H04W 88/08* | (2009.01) |

(52) U.S. Cl.
CPC ............. *H04W 48/18* (2013.01); *H04W 4/00* (2013.01); *H04W 4/30* (2018.02); *H04W 88/18* (2013.01); *H04W 88/06* (2013.01); *H04W 88/085* (2013.01)

(58) Field of Classification Search
CPC ......... H04W 48/18; H04W 4/00; H04W 4/30; H04W 88/06; H04W 88/085; H04W 88/18
See application file for complete search history.

(56) References Cited

U.S. PATENT DOCUMENTS

| 2017/0079059 A1 | 3/2017 | Li et al. | |
| 2017/0303259 A1* | 10/2017 | Lee | ........................ H04W 28/16 |
| 2018/0227873 A1* | 8/2018 | Vrzic | ..................... H04W 76/27 |
| 2018/0270712 A1* | 9/2018 | Faccin | ................... H04W 48/18 |

FOREIGN PATENT DOCUMENTS

| WO | 2016192636 A1 | 12/2016 |
| WO | 2017032280 A1 | 3/2017 |

OTHER PUBLICATIONS

International Search Report and Written Opinion—PCT/US2018/023002—ISA/EPO—dated Jun. 12, 2018.
(Continued)

*Primary Examiner* — Kashif Siddiqui

(57) ABSTRACT

Techniques are described using network slice information to negotiate and select network services by determining a set of desired required network provided functionalities; identifying a set of network slices providing one or more of the functionalities in the set of required functionalities; and communicating, to a network, a slice identifier for each slice in the set of the identified network slices.

22 Claims, 9 Drawing Sheets

(56) References Cited

OTHER PUBLICATIONS

Samsung: "Single Value of NSSAI in RRC for CCNF (AMF) Selection," 3GPP Draft; S2-171153 Single Value of NSSAI in RRC for CCNF (AMF) Selection, 3rd Generation Partnership Project (3GPP), Mobile Competence Centre; 650, Route Des Lucioles; F-06921 Sophia-Antipolis Ced, vol. SA WG2, no. Dubrovnik, Croatia; 20170213-20170217, Feb. 7, 2017 (Feb. 7, 2017), XP051228409, 3 pages, Retrieved from the Internet: URL: http://www.3gpp.org/ftp/tsg_sa/WG2_Arch/TSGS2_119_Dubrovnik/Docs/ [retrieved on Feb. 7, 2017].

ZTE Oracle Etri Telecom Italia KDDI: "Networking Slicing Architecture Alignment for the Support of Standalone Network Slice Selection Function (NSSF)," 3GPP Draft; S2-171027-NS Alignment with 5GC Architecture Presentation, 3rd Generation Partnership Project (3GPP), Mobile Competence Centre; 650, Route Des Lucioles; F-06921 Sophia-Antipolis Cedex; vol. SA WG2, no. Dubrovnik, Croatia; 20170213-20170217, Feb. 13, 2017, XP051217149, slides 1-11, Retrieved from the Internet: URL: http://www.3gpp.org/ftp/Meetings_3GPP_SYNC/SA/.

* cited by examiner

SLICE 1: MOBILITY, >10Mbps

SLICE 2: MOBILITY, LOW LATENCY, HIGH RELIABILITY

SLICE 3: NO MOBILITY, HIGH SECURITY, HI BANDWIDTH UL, LOW BANDWIDTH DL

...

SLICE n: NO MOBILITY, <100 BYTES PER DAY, RELIABILITY, BATTERY SAVING

FIG. 4

| SLICE ID | ACCESS | AUTHENTICATION | >10 Mbps | >1 Gbps | ENCRYPTION | HIGH RELIABILITY | LOW LATENCY | METERING | BATTERY SAVING | MOBILITY | ... | NF m |
|---|---|---|---|---|---|---|---|---|---|---|---|---|
| SLICE 1 | B | B | N | b | | | | N | | U | | n |
| SLICE 2 | B | B | N | N | | N | N | n | | U | | |
| SLICE 3 | B | B | | b | B | | | N | | u | | |
| ... | | | | | | | | | | | | |
| SLICE n | B | B | | | | N | n | n | B | b | | b |

FIG. 5

NETWORK SERVICE CONFIGURATION AND SELECTION USING NETWORK SLICES

CROSS-REFERENCE TO RELATED APPLICATION(S)

This application claims priority to and the benefit of provisional patent application No. 62/474,007 filed in the U.S. Patent and Trademark Office on Mar. 20, 2017, the entire content of which is incorporated herein by reference.

INTRODUCTION

The following relates generally to wireless communication, and more specifically to techniques for negotiation and selection of network service.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

The advent of ubiquitous wireless communications has resulted in a dramatic increase in the number of connected devices. Future networks will be expected to accommodate an ever-increasing number of devices. However, a one-size-fits-all approach to allocation of network resources will be inefficient in the face of tens or hundreds of billions of devices with a wide range of different communication needs. To support that number of devices, it is necessary to tailor network resource allocation to match the needs of individual devices. Accordingly, it would be desirable to provide techniques for UEs and networks to negotiate and select services.

SUMMARY

The described techniques relate to improved methods, systems, devices, or apparatuses that support negotiation and selection of network provided services and functionality. Generally, the described techniques provide for a method for a wireless device to transmit required services and functionality to a network. The method may include determining a set of desired required network provided functionalities; identifying a set of network slices providing one or more of the functionalities in the set of required functionalities; and communicating, to a network, a slice identifier for each slice in the set of the identified network slices.

An apparatus for wireless communication is described. The apparatus may include means for determining a set of desired required network provided functionalities; identifying a set of network slices providing one or more of the functionalities in the set of required functionalities; and communicating, to a network, a slice identifier for each slice in the set of the identified network slices.

Another apparatus for wireless communication is described. The apparatus may include a processor, memory in electronic communication with the processor. The processor and memory may be configured to cause the processor to determine a set of desired required network provided functionalities; identify a set of network slices providing one or more of the functionalities in the set of required functionalities; and communicate, to a network, a slice identifier for each slice in the set of the identified network slices.

A non-transitory computer readable medium for wireless communication is described. The non-transitory computer-readable medium may include instructions operable to cause a processor to determine a set of desired required network provided functionalities; identify a set of network slices providing one or more of the functionalities in the set of required functionalities; and communicate, to a network, a slice identifier for each slice in the set of the identified network slices.

Some examples of the method, apparatus, and non-transitory computer-readable medium described above may further include processes, features, means, or instructions for comparing the set of required functionalities to preconfigured data associating network provided functionalities with network slice identifiers. In other examples, they may include identifying a set of one or more optional functionalities or identifying one or more network slices having functionalities matching one or more of the required functionalities. The identifying may include identifying one or more network slices having functionalities matching one or more of the required functionalities; selecting a network slice having a most number of matching functionalities; or when two or more network slices have functionalities matching one or more of the desired functionalities, the identifying further comprises selecting the network slice further having one or more preferred functionalities.

Some examples of the method, apparatus, and non-transitory computer-readable medium described above may further include processes, features, means, or instructions for comparing the set of required functionalities to preconfigured data associating network provided functionalities with network slice identifiers. The preconfigured data may be provisioned by the network. In other examples, the slice identifiers may include Network Slice Selection Assistance Information (NSSAI).

Yet other examples of the method, apparatus, and non-transitory computer-readable medium described above may further include processes, features, means, or instructions for identifying one or more network slices that provide functionalities needed by the UE; and transmitting, to the network, an indication of the one or more identified network slices.

In further examples the method, apparatus, and non-transitory computer-readable medium described above may further include processes, features, means, or instructions for accepting, from a user equipment (UE), a communication request, the communication request including an identification of one or more network slices; selecting, one or more of the identified network slices based on an ability of the network to provide functionality corresponding to the one or more selected slices; and transmitting, to the UE, an indication of the selected one or more of the identified network slices. They may also include processes, features, means, or instructions for provisioning the UE with data detailing slice identifiers and network functionalities provided by each one of a set of network slices, and accepting one or one or more of the slice identifiers; for accepting from the UE an indication distinguishing preferred functionalities from required functionalities.

Yet other examples of the method, apparatus, and non-transitory computer-readable medium described above may further include processes, features, means, or instructions for selecting an alternative compatible networks slice when none of the one or more network slices are supported by the network; for transmitting an indication of an alternative compatible network slice; or for rejecting the communication request when none of the one or more network slices are supported by the network.

BRIEF DESCRIPTION OF THE DRAWINGS

FIG. 4 illustrates exemplary functionalities that may be provided by a number of network slices, in accordance with one or more aspects of the present disclosure.

FIG. 5 illustrates an example mapping of network functionality to a slice identifier, in accordance with one or more aspects of the present disclosure.

DETAILED DESCRIPTION

Wide spread connectivity has ushered in an era in which all manner of devices are being given the ability to interconnect with other devices to improve old processes or create new ones. For example, smartphones and tablets enable users to view videos and play interactive games almost anywhere. Smart cities are able to monitor conditions and react, for example, to control stoplights to ease traffic congestion. The types of wireless devices vary widely, as do their connectivity needs. For example, watching a video may require bandwidth of several mega bytes per second, whereas an environmental sensor may only need a bandwidth of a few hundred bytes per week.

This introduces inefficiencies when a network is attempting to concurrently provide service to such a large range of devices. Consider 4G LTE, mobile network operators provide best effort mobile broadband (MBB) services and generally meter services by counting bytes. Third parties may then offer end user services such as music and video streaming, navigation, social media, and real-time or near real-time text, voice and video communications services using the operator provided MBB service. Currently, a UE with access to LTE MBB services gets the full benefit of all deployed Radio Access Network (RAN) and evolved packet core (EPC) services, including best effort internet connectivity on a default PDN connection, mobility within LTE and to other Radio Access Technologies (RATs), VoLTE services, etc. This can be an inefficient use of network resources.

Figure 1:
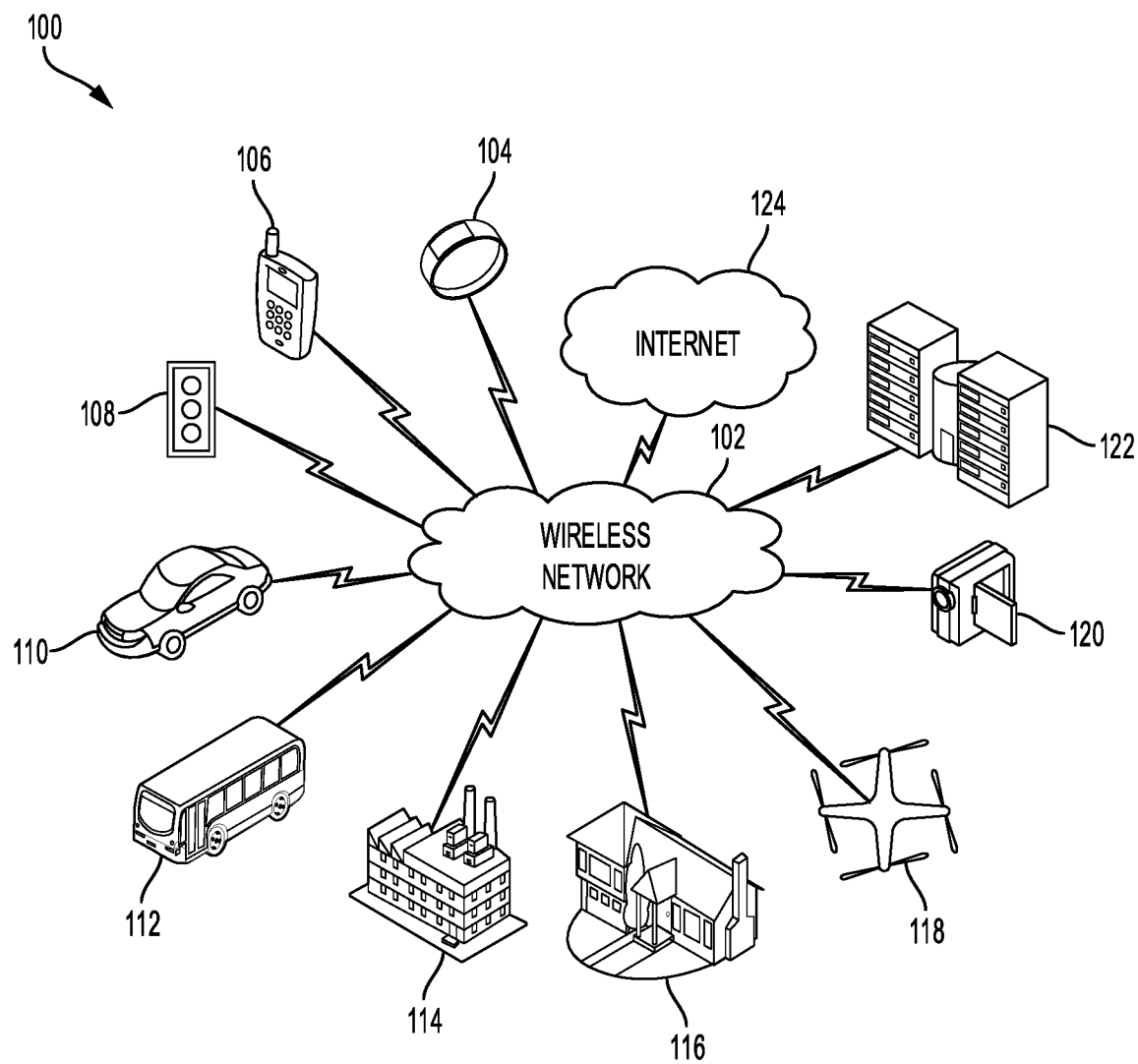
FIGS. 1 and 2 illustrate examples of wireless communication systems in accordance with one or more aspects of the present disclosure.

As shown in FIG. 1, exemplary wireless communication devices may include devices such as wearable devices 104, phone 106, infrastructure (traffic light) 108, vehicle 110, city bus 112, commercial buildings 114, residence 116, remote robotics 118, sensor (camera) 120, and computer 122. In the present disclosure these devices, and any wireless device connected to wireless network 202, are referred to as user equipment, or UE. A UE may be a cellular phone, a personal digital assistant (PDA), a wireless modem, a wireless communication device, a handheld device, a tablet computer, a laptop computer, a cordless phone, a wireless local loop (WLL) station. A UE may additionally or alternatively include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. Additionally or alternatively, a UE may be able to communicate directly with other UEs.

Figure 2:
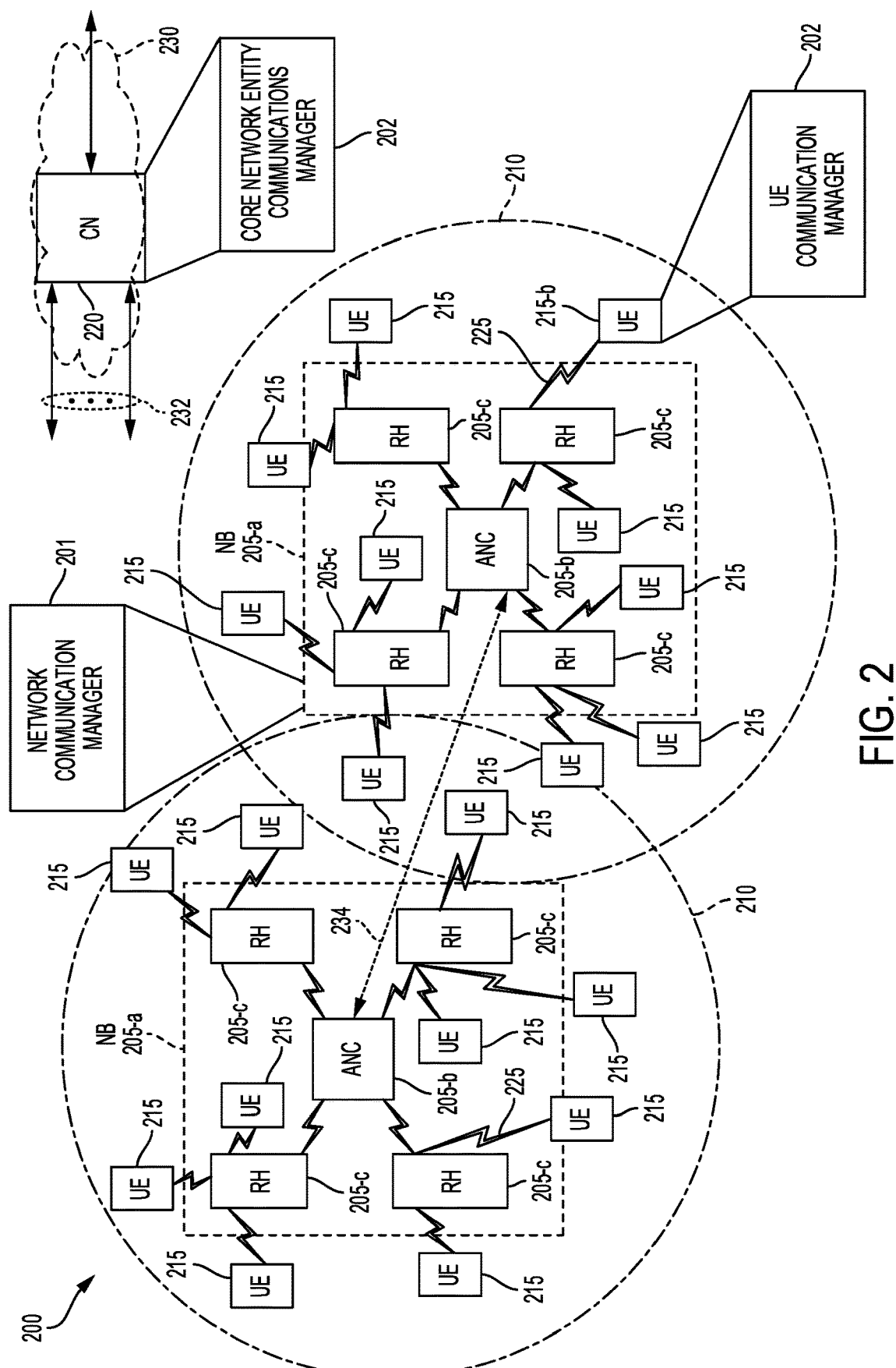

FIG. 2 illustrates an example of a wireless communication system 200 for wireless communication that supports using network slicing to negotiate and select network services and functionality, in accordance with one or more aspects of the present disclosure. The wireless communication system 200 may include network access devices 205, UEs 215, and core network (CN) 230. In some examples, the wireless communication system 200 may be an LTE (or LTE-Advanced) network, or a 5G NR network. In some cases, wireless communication system 200 may support enhanced broadband communications, ultra-reliable (i.e., mission critical) communications, low latency communications, and communications with low-cost and low-complexity devices.

The CN 230 may provide user authentication, access authorization, tracking, Internet Protocol (IP) connectivity, and other access, routing, or mobility functions. Network access devices may also be referred to as base stations, NodeBs, evolved NodeBs (eNBs), next generation NodeBs (gNBs), access points (APs) and the like. At least some of the network access devices 205 may interface with the CN 230 through backhaul links 232 (e.g., S1, S2, etc.) and may perform radio configuration and scheduling for communication with the UEs 215. In various examples, the ANCs 205-b may communicate, either directly or indirectly (e.g., through CN 230), with each other over backhaul links 234 (e.g., X1, X2, etc.), which may be wired or wireless communication links. Additionally or alternatively, each ANC 205-b may communicate with a number of UEs 215 through a number of smart radio heads (radio heads) 205-c. In an alternative configuration of the wireless communication system 200, the functionality of an ANC 205-b may be provided by a radio head 205-c or distributed across the radio heads 205-c of an gNB 205-a. In another alternative configuration of the wireless communication system 200, the radio heads 205-c may be replaced with base stations, and the ANCs 205—may be replaced by base station controllers (or links to the CN 230).

The ANCs 205-b may wirelessly communicate with the UEs 215 via one or more radio heads 205-c, with each radio head 205-c having one or more antenna. Each of the radio heads 205-c may provide communication coverage for a respective geographic coverage area 210. The geographic coverage area 210 for a radio head 205-c may be divided into sectors making up only a portion of the coverage area (not shown). In some examples, the network access devices 205 may be replaced with alternative network access devices, such as base transceiver stations, radio base stations, access points, radio transceivers, NodeBs, eNBs, gNBs, Home NodeBs, Home eNBs, etc. The wireless communication system 200 may include radio heads 205-c (or base stations or other network access devices) of different types (e.g., macro cell and/or small cell network access devices). The one or more geographic coverage areas 210 of the radio heads 205-c or other network access devices may overlap. In some examples, different gNBs 205-a may be associated with different radio access technologies.

In some examples, the wireless communication system 200 may include a 5G network. In other examples, the wireless communication system 200 may include a LTE/LTE-A network. In some cases, the wireless communication system 200 may be a heterogeneous network, in which different types of gNBs provide coverage for various geographical regions. For example, each gNB 205-a or radio head 205-c may provide communication coverage for a macro cell, a small cell, and/or other types of cell. The term "cell" is a 3GPP term that can be used to describe a base station, a radio head, a carrier or component carrier associated with a base station or a radio head, or a coverage area (e.g., sector, etc.) of a carrier or base station, depending on context.

A macro cell may cover a relatively large geographic area (e.g., several kilometers in radius) and may allow unrestricted access by UEs 215 with service subscriptions with a network provider. A small cell may include a lower-powered radio head or base station, as compared with a macro cell, and may operate in the same or different frequency band(s) as macro cells. Small cells may include pico cells, femto cells, and micro cells according to various examples. A pico cell may cover a relatively smaller geographic area and may allow unrestricted access by UEs 215 with service subscriptions with a network provider. A femto cell may additionally or alternatively cover a relatively small geographic area (e.g., a home) and may provide restricted access by UEs 215 having an association with the femto cell (e.g., UEs in a closed subscriber group (CSG), UEs for users in the home, and the like). An gNB for a macro cell may be referred to as a macro gNB. An gNB for a small cell may be referred to as a small cell gNB, a pico gNB, a femto gNB or a home gNB. An gNB may support one or multiple (e.g., two, three, four, and the like) cells (e.g., component carriers).

The wireless communication system 200 may support synchronous or asynchronous operation. For synchronous operation, the gNBs 205-a and/or radio heads 205-c may have similar frame timing, and transmissions from different gNBs 205-a and/or radio heads 205-c may be approximately aligned in time. For asynchronous operation, the gNBs 205-a and/or radio heads 205-c may have different frame timings, and transmissions from different gNBs 205-a and/or radio heads 205-c may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may additionally or alternatively use Hybrid ARQ (HARQ) to provide retransmission at the MAC layer to improve link efficiency. In the control plane, the RRC protocol layer may provide establishment, configuration, and maintenance of an RRC connection between a UE 215 and a radio head 205-c, ANC 205-b, or CN 230 supporting radio bearers for user plane data. At the Physical (PHY) layer, transport channels may be mapped to physical channels.

The communication links 225 shown in wireless communication system 200 may include uplink (UL) channels from a UE 215 to a radio head 205-c, and/or downlink (DL) channels, from a radio head 205-c to a UE 215. The downlink channels may additionally or alternatively be called forward link channels, while the uplink channels may additionally or alternatively be called reverse link channels. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques (e.g., as described with reference to FIGS. 3-8). In some examples, the control information transmitted during a TTI or slot of a downlink channel may be distributed between different control regions in a cascaded manner (e.g., between a common control region and one or more UE-specific control regions).

In some examples, responsive to powering on, UE 215 may search for wireless networks from which the UE 215 may receive and identify communication service. UE 215 may also perform registration process on an identified network (e.g., serving network gNB 205-a), and UE 215 may operate in a connected mode to actively communicate with the identified network. Alternatively, UE 215 may operate in an idle mode and camp on a serving network if an active communication session is not available for UE 215. In the idle mode, UE 215 may identify all radio access technologies (RATs) in which UE 215 is able to find an available serving cell.

Each communication link 225 may include one or more carriers, where each carrier may be a signal made up of multiple sub-carriers (e.g., waveform signals of different frequencies) modulated according to one or more radio access technologies. Each modulated signal may be sent on a different sub-carrier and may carry control information (e.g., reference signals, control channels, etc.), overhead information, user data, etc. The communication links 225 may transmit bidirectional communications using Frequency Division Duplexing (FDD) techniques (e.g., using paired spectrum resources) or Time Division Duplexing (TDD) techniques (e.g., using unpaired spectrum resources). Frame structures for FDD (e.g., frame structure type 1) and TDD (e.g., frame structure type 2) may be defined.

In some examples of the wireless communication system 200, the radio heads 205-c and/or UEs 215 may include multiple antennas for employing antenna diversity schemes to improve communication quality and reliability between radio heads 205-c and UEs 215. Additionally or alternatively, radio heads 205-c and/or UEs 215 may employ multiple-input, multiple-output (MIMO) techniques that may take advantage of multi-path environments to transmit multiple spatial layers carrying the same or different coded data.

The wireless communication system 200 may support operation on multiple cells or carriers, a feature which may be referred to as carrier aggregation (CA) or multi-carrier operation. A carrier may additionally or alternatively be referred to as a component carrier (CC), a layer, a channel, etc. The terms "carrier," "component carrier," "cell," and "channel" may be used interchangeably herein. A UE 215 may be configured with multiple downlink CCs and one or more uplink CCs for carrier aggregation. Carrier aggregation may be used with both FDD and TDD component carriers.

In some cases, a UE 215 may also be able to communicate directly with other UEs (e.g., using a peer-to-peer (P2P) or device-to-device (D2D) protocol). One or more of a group of UEs 215 utilizing D2D communications may be within the geographic coverage area 210 of a cell. Other UEs 215 in such a group may be outside the geographic coverage area 210 of a cell, or otherwise unable to receive transmissions from network access devices 205. In some cases, groups of UEs 215 communicating via D2D communications may utilize a one-to-many (1:M) system in which each UE 215 transmits to every other UE 215 in the group. In some cases, network access devices 205 facilitate the scheduling of resources for D2D communications. In other cases, D2D communications are carried out independent of network access devices 205.

Some UEs 215, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 215 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communications system may be configured to provide ultra-reliable communications for these functions.

Network access devices 205 may be connected by an S1 interface to the CN 230. The CN may be an evolved packet core (EPC), which may include at least one MME, at least one S-GW, and at least one P-GW. The mobile management entity (MME) may be the control node that processes the signaling between the UE 215 and the EPC. All user IP packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service (PSS).

The CN 230 may provide user authentication, access authorization, tracking, Internet Protocol (IP) connectivity, and other access, routing, or mobility functions. At least some of the network devices, such as gNB 205-$a$ may include subcomponents such as an access network entity 205-$b$, which may be an example of an access node controller (ANC). Each access network entity 205-$b$ may communicate with a number of UEs 215 through a number of other access network transmission entities 205-$c$, each of which may be an example of a smart radio head, or a transmission/reception point (TRP).

Wireless communication system 200 may support millimeter wave (mmW) communications between UEs 215 and network access devices 205. Devices operating in mmW or extremely high frequency (EHF) bands may have multiple antennas to allow beamforming. That is, network access devices 205 may use multiple antennas or antenna arrays to conduct beamforming operations for directional communications with a UE 215. Beamforming (which may also be referred to as spatial filtering or directional transmission) is a signal processing technique that may be used at a transmitter (e.g., network access devices 205) to shape and/or steer an overall antenna beam in the direction of a target receiver (e.g. a UE 215). This may be achieved by combining elements in an antenna array in such a way that transmitted signals at particular angles experience constructive interference while others experience destructive interference.

Multiple-input multiple-output (MIMO) wireless systems use a transmission scheme between a transmitter (e.g. a base station) and a receiver (e.g. a UE), where both transmitter and receiver are equipped with multiple antennas. Some portions of wireless communication system 200 may use beamforming. For example, network access devices 205 may have an antenna array with a number of rows and columns of antenna ports that the base station 205 may use for beamforming in its communication with UE 215. Signals may be transmitted multiple times in different directions (e.g., each transmission may be beamformed differently). A mmW receiver (e.g., a UE 215) may try multiple beams (e.g., antenna subarrays) while receiving the synchronization signals.

In some cases, the antennas of network access devices 205 or UE 215 may be located within one or more antenna arrays, which may support beamforming or MIMO operation. One or more base station antennas or antenna arrays may be collocated at an antenna assembly, such as an antenna tower. In some cases, antennas or antenna arrays associated with network access devices 205 may be located in diverse geographic locations. Network access devices 205 may multiple use antennas or antenna arrays to conduct beamforming operations for directional communications with a UE 215.

In some cases, wireless communication system 200 may utilize both licensed and unlicensed RF spectrum bands. For example, wireless communication system 200 may employ LTE License Assisted Access (LTE-LAA) or LTE Unlicensed (LTE U) radio access technology or NR technology in an unlicensed band such as the 5 Ghz Industrial, Scientific, and Medical (ISM) band. When operating in unlicensed RF spectrum bands, wireless devices such as network access devices 205 and UEs 215 may employ listen-before-talk (LBT) procedures to ensure the channel is clear before transmitting data. In some cases, operations in unlicensed bands may be based on a carrier aggregation (CA) configuration in conjunction with component carriers (CCs) operating in a licensed band. Operations in unlicensed spectrum may include downlink transmissions, uplink transmissions, or both.

Figure 3:
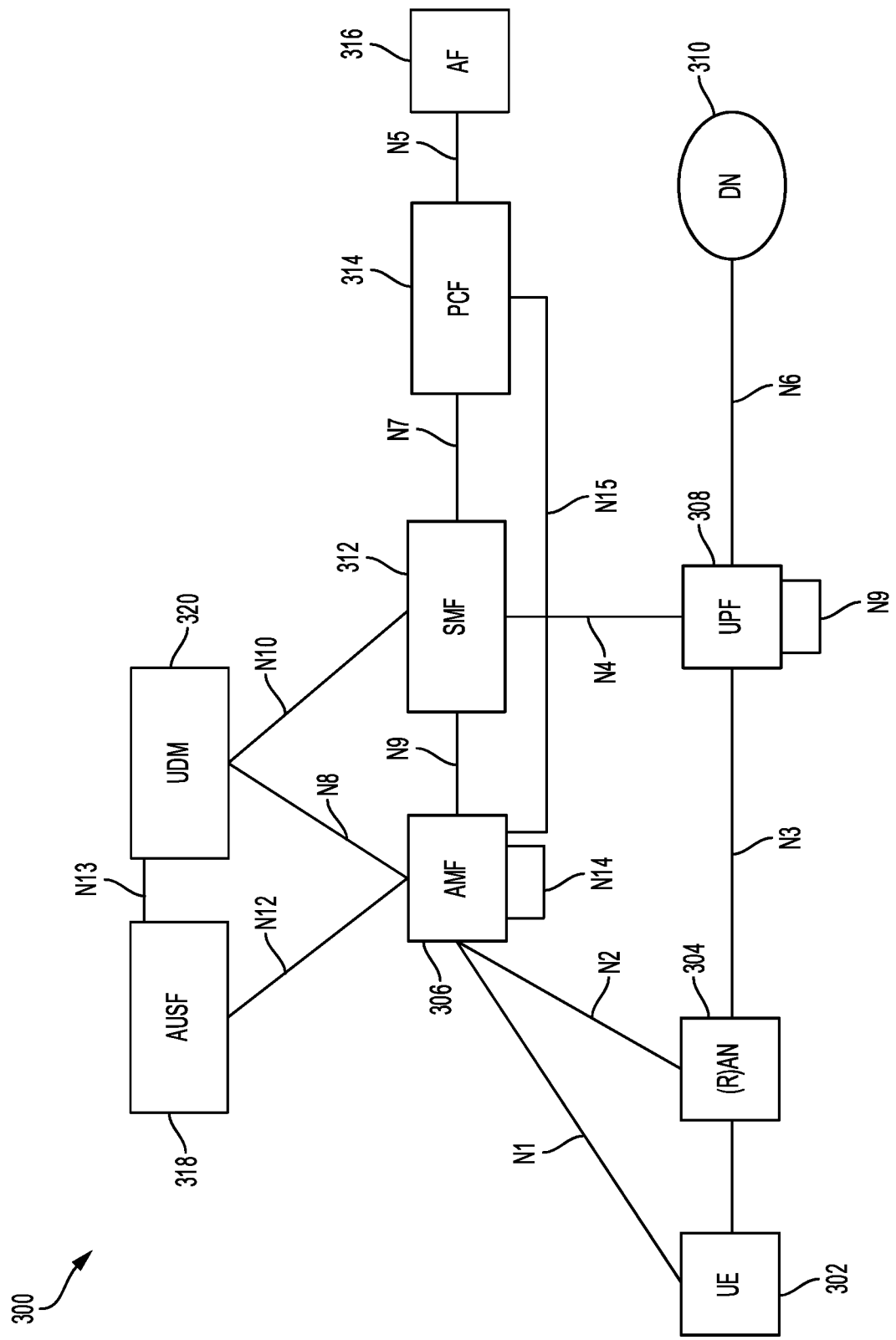
FIG. 3 illustrates exemplary functionality provided by a wireless communication system, in accordance with one or more aspects of the present disclosure.

A network provides telecommunication services and capabilities through a collection of network functions and corresponding network resources. FIG. 3 illustrates an example of the wireless communication system 300 in which multiple network functionalities are used to supports device connectivity, in accordance with one or more aspects of the present disclosure. An example of wireless communication system 300, may include UE 302, (radio) access network ((R)AN) 304, core access and mobility management function (AMF) 306, user plane function (UPF) 308, data network (DN) 310, session management function (SMF) 312, policy control function (PCF) 314, application function (AF) 316, authentication server function (AUSF) 318 and unified data management function (UDM) 320. UE 302 may be, for example, one of the corresponding devices described with reference to FIG. 1 or 2.

As described hereinabove, different UEs may have different communication needs. In particular, two UEs may have different communications requirements and therefore may require the network to provide different functions or services. In accordance with certain aspects of the present disclosure, a UE may indicate its needed functionality to the network, and the network selects network functions that support the needs of the UE. Alternatively, the network may reject the UE request when it cannot or will not provide the requested functionality.

As an example, a wireless network maybe configured to provide fixed broadband service, such as broadband internet service to a business or residence. In this case, the UE is a fixed customer premises equipment (CPE), similar to a cable or DSL modem, and serves as a residential gateway to share 5G internet connectivity within a building via WiFi and/or Ethernet. This kind of CPE does not require most of the services typically provided by a mobile wireless network. The CPE can be line powered, so functions designed to extend battery life, standby modes, may not be needed. It does not move, so mobility procedures can be simplified or eliminated. The CPE may not need 4G/5G interworking, VoLTE support is not required, and QoS could be limited to a cap on the aggregated maximum bit rate (AMBR.). Accordingly, the set of network functions needed to support a UE acting as a CPE to provide fixed wireless broadband can be significantly simpler than the set of functions needed to support mobile broadband.

Techniques described herein use the concept of network slices for a UE to communicate its needs to the network to negotiate and select specific network functionality. Aspects of the disclosure are initially described in the context of a wireless communications system. Aspects of the disclosure are further illustrated by and described with reference to the accompanying apparatus diagrams, system diagrams, and flowcharts.

3GPP defines a network slice as "a set of network functions and corresponding resources necessary to provide the required telecommunication services and network capabilities." Network slices are expected to be functionally and securely isolated from one another, with the ability to flexibly expand or contract capacity using virtualized network functions. Network slices enable a physical network to partition its resources so as to provide the appearance of multiple separate networks. Network slicing may enable one or more services to run over a dedicated network slice (e.g., radio access network (RAN) portion and/or a core network (CN) portion). For example, dedicated network slices may include machine-type-communication (MTC) on an MTC network slice, mobile broadband (MBB) on an MBB network slice, or high reliability low latency (HRLL) communications on a HRLL network slice, etc. The present disclosure also describes various technique with reference to next generation networks (e.g., 5G or NR networks) designed to support features such as service negotiation and selection using network slicing.

Techniques described herein use the concept of network slices for a UE to communicate its needs to the network to negotiate and select specific network functionality. A slice is a set of network functions and corresponding resources. Typically, a slice identifier identifies a slice. For example, in 3GPP 5G, a slice is defined or identified by a Single Network Slice Selector Assistance Information (S-NSSAI), which includes a Slice/Service Type (SST) and a Service Differentiator. The SST defines the expected network behavior in terms of features and services. The SD may enable the selection of a specific network slice instance (NSI) when there are multiple slices having the same SST. Illustrative slices expected to be deployed by network operators include evolved mobile broadband (eMBB), massive machine type communication (MMTC) and high-reliability/low latency/ mission critical communication. Accordingly, each such slice will have a corresponding SST and an SD may be used to further refine the network slice and or select from among multiple similar slices. For example, two eMBB slices have different bandwidth or usage caps may each have a unique SST, or they may have the same SST and use an SD to select between them. An NSSAI is a set of S-NSSAI.

As an example, FIG. 4 illustrates functionality provided by exemplary Slices 1, 2, 3 and n. As shown, exemplary Slice 1, provides a mobility function and can support bandwidth of more than 10 Mbps. Slice 2 provides mobility, low latency and high reliability. Slice 3 provides no mobility, high security, high uplink bandwidth and low downlink bandwidth. Whereas, Slice n provides no mobility, capacity of less than 200 bytes per day, high reliability, and battery saving functionality. It will be readily apparent that these slice identifiers and definitions are provided for purposes of exposition and illustration and not of limitation. One skilled in the art will understand there are many other network functionalities that may be included in a slice definition. Indeed, it is expected that the principles described herein will also be able to accommodate new functionalities yet to be developed.

To efficiently provide services to UEs having different requirements, it would be desirable for the UE to specify its needs to the network and for the network to accept or reject. In accordance with the principles disclosed herein, a UE is configured or provisioned with information, e.g., NSSAI, describing the network slices and the network functionalities provided by each network slice. As an example, the information may take the form of a table, list, database, or other data structure that associates network slice identifiers with the corresponding functionality provided by each identified slice. The functionalities may be an end-to-end feature, such as support for power saving functions, cell reselection, etc. Alternatively, functionalities may refer to a specific value of range of values for a parameter, such as minimum throughput, minimum DRX cycle length, mobility level, etc.

Some functionality may be designated as baseline required functionality. That is, a set of functionality that must be supported by the network and by the UE to be able to use the corresponding slice. Slice baseline functionality need not be the same as system baseline functionality. Baseline functionality may be a superset of system baseline functionality. For example, baseline functionality for a specific network slice may include required 5G system baseline functionality plus some additional optional 5G system functionality. Likewise, slice baseline functionality may be a subset or system baseline functionality. For example, complete 5G mobility functionality may not be needed for a specific network slice.

Some functionality may be designated as network required functionality. That is, functionality that must be provided by the network but may not actually be used by the UE. As an example, a network may be required to support mobility management functionality according to a slice definition; however, the UE need not use that functionality. Other functionality may be designated as UE required functionality, that must be supported by the UE, but may not be used by the network. Additionally, some functionality may be designated as optional, to indicate functionality that may be provided but is not required to be provided by either the network or the UE. For example, a slice baseline functionality may specify a minimum throughput as well as an optional functionality specifying a higher throughput.

FIG. 5 shows an example of network slice information that may be provided to a UE. Network slice information may be database table 500 having a number of rows 502, each corresponding to a network slice. Database rows 502 may include network slice identifier 504 and functionality indicators 506. Functionality indicators 506 provide information designating which features are baseline features, which features are required to be supported by the network or by the UE, and which features are optionally supported. In example database table 500, capital letters signify required functionality, whereas lowercase letters signify optional functionality, the letter 'N' and 'n' applies to the network, 'U' and 'u' apply to the UE, and 'B' and 'b' apply to both. Accordingly, a 'B' entry in table 500 indicates a functionality that is required to be supported by both the network and the UE, whereas a 'n' entry signifies functionality that may optionally be provided by the network. Of course, this specific mapping is provided for ease of description. An actual implementation would use representations more suitable for storage on and use by a UE.

When the UE initiates communications, it determines what functionalities are required to support the type of communication being initiated. It may further determine which functionalities are required and which are optional, which are applicable to the UE, to the network, or to both the UE and the network. The UE then searches table 500 to find slice identifiers 504 corresponding to a slice that best supports the type of communication being initiated. At a minimum, an identified slice should support all functionalities that are designated as required. Slices may also support functionalities that are not required by the UE. Identified slices may also support additional functionalities, such as functionalities designated as optional. When more than one slice supports the type of communication being initiated, some slices may be designated as preferred slices to indicate to the network a preference for one slice over another.

Figure 6:
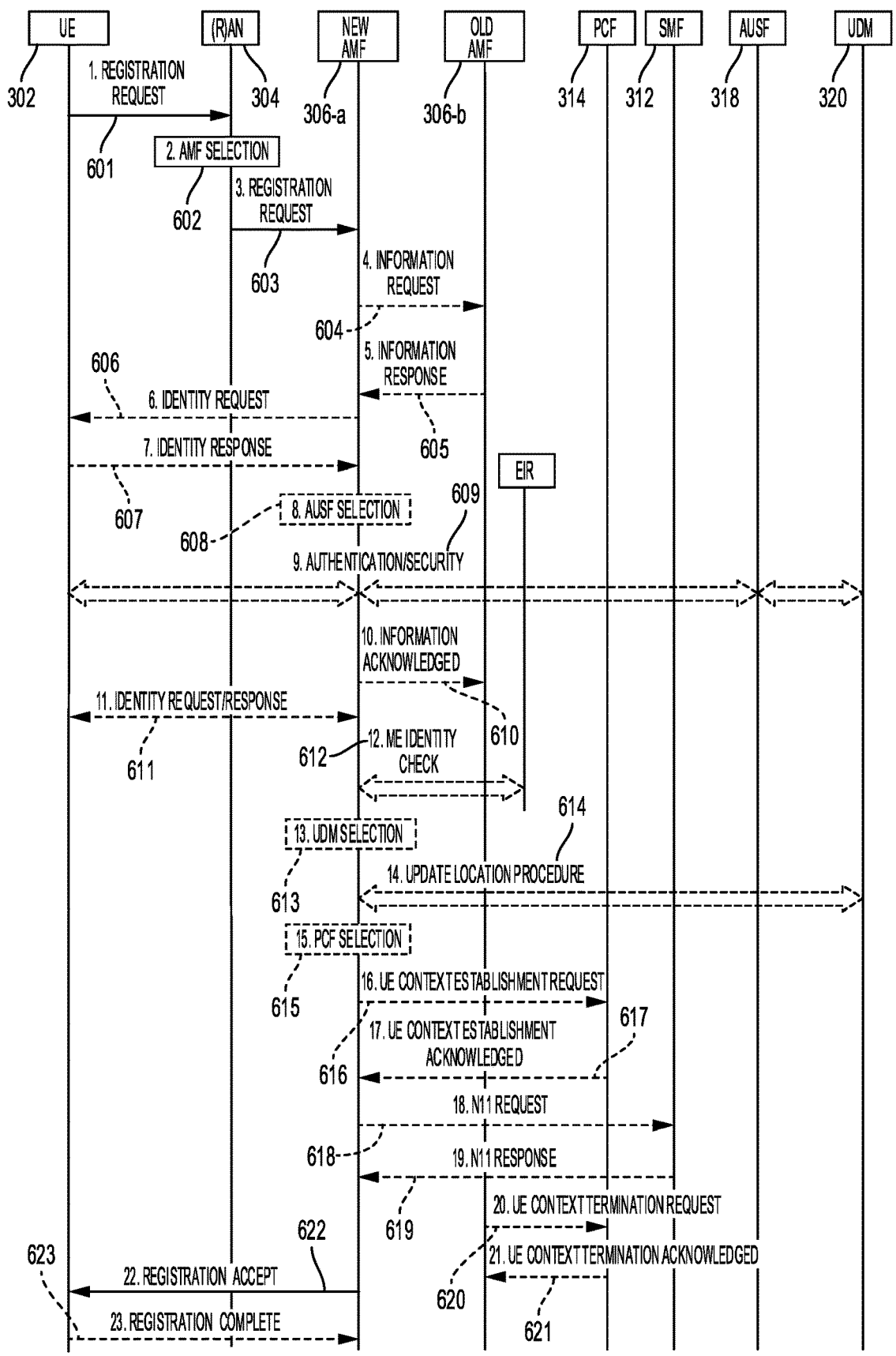
FIG. 6 illustrates an example of a call flow that supports network service negotiation and selection based on network slices, in accordance with one or more aspects of the present disclosure.

Referring now to FIG. 6, an example of call flow 600 for initiating communications is described. At 601 UE 215 sends a registration request to (R)AN 630, which may include various parameters such as the registration type, a subscriber identifier, security parameters, UE capabilities, a set of network slice identifiers, and PDU session status. The registration type may indicate, for example, whether the registration is an "initial registration", a "mobility registration", or a "periodic registration". In accordance with the principles disclosed herein, the set of network slice identifiers, e.g., NSSAI, included with the registration request, include a set of network slice identifiers corresponding to the ones the UE has determined provide support for the type of communication.

The UE forms the NSSAI depending on configuration and required service, required functionality, functionality not supported, and optional preferred/not preferred functionality. As described above, the UE may also indicate which S-NSSAIs are required and which are preferred.

Normally, specific functionality is negotiated once the CN function (AMF or SMF) are selected. However, if the selected CN function is unable to provide the requested functionality, it will be necessary to redirect the UE to another CN function that can provide support. The techniques described herein use the concept of network slices for a UE to communicate its needs to the network before CN selection to avoid these unnecessary redirections.

Accordingly, at 602 the (R)AN, based on (R)AT and NSSAI, if available, selects an AMF. For each UE requested network slice, e.g. S-NSSAI, the RAN node checks if the UE requested slice is supported, or if alternative compatible slices are available. An alternative compatible slice is defined as a slice that supports the same required functionality as the UE requested slice but may differ in the preferred/optional functionality. For example, an alternative compatible slice may require network functionality that is optional in the UE requested network slice.

RAN node 304 selects an AMF based on the list of UE provided slices or based on an alternative compatible slice if the UE requested slices are not supported. If no alternative compatible slice is found, RAN node 304 may either reject the RRC connection request with a cause code indicating network slice incompatibility, or, alternatively, the RAN node may select a default AMF.

At 603, (R)AN node 304 forwards the connection request to AMF 306. The forwarded request may include additional information such as location information, cell identity and RAT type related to the cell in which the UE is camping. If the selected AMF has changed since the last registration, at 604, new AMF 306-a may send an information request to old AMF 306-b including the complete registration request to get additional information related to UE 215, e.g, the UE's SUPI and MM Context. If old AMF 306-b holds information about active PDU sessions, at 605, the old AMF may send SMF information including SMF identities and PDU session identities to new AMF 306-a.

If the SUPI is not provided by the UE nor retrieved from the old AMF the Identity Request procedure is initiated by AMF 306-a sending an Identity Request message to the UE, at 606 and receiving an Identity Response from UE 215 at 607. At 608, AMF 306-a may select an authentication function, AUSF 318, to initiate authentication of the UE and NAS security functions, at 609.

At 610, if the AMF changed, new AMF 306-a acknowledges the transfer of UE MM context to old AMF 206-b. If the authentication/security procedure fails, then the Registration shall be rejected, and new AMF 306-a sends a reject indication to old AMF 306-b, and old AMF 306-b continues as if the Information Request was never received.

If the PEI was not provided by UE 215 nor retrieved from old AMF 306-b an Identity Request procedure is initiated by AMF 306-a by sending an Identity Request message to UE 215 to retrieve the PEI, at 611. At 612, a PEI check is performed.

At 613, if step 14 is to be performed, AMF 306-a, selects UDM 320, based on the SUPI. If the AMF has changed since the last registration, or if there is no valid subscription context for UE 215 in the AMF, or if UE 215 provides a SUPI which does not refer to a valid context in the AMF, AMF 306-a initiates the Update Location procedure. This will cause old AMF 306-b to remove any MM context and notify any associated SMF(s) 312. New AMF 306-a creates an MM context for the UE after getting AMF related subscription data from UDM 320.

Based on the SUPI, AMF 306-a selects PCF 314 at 615 and requests PCF 314 to apply operator policies for UE 215. At 617 PCF 314 acknowledges the UE Context Establishment Request message.

If the AMF has changed, new AMF 306-a notifies each SMF 312 of the new AMF serving the UE, at 618. The AMF verifies PDU session status from the UE with the available SMF information. In case the AMF has changed the available SMF information has been received from the old AMF. AMF 306-a requests SMF(s) 312 to release any network resources related to PDU sessions that are not active in UE 215. SMF 312 may decide to trigger relocation of UPF 308.

At 620, if old AMF 306-a previously requested UE context to be established in PCF 314, old AMF 306-b terminates the UE context in PCF 314. Which is acknowledged at 621.

At 622, AMF 306-a sends a Registration Accept message to UE 215 indicating that the registration has been accepted. A Temporary User ID is included if AMF 306-a allocates a new Temporary User ID. Mobility restrictions may be included in case mobility restrictions apply for UE 215. AMF 306-a may also indicate the PDU session status to UE 215. UE 215 removes any internal resources related to PDU sessions that are not marked active in the received PDU session status. If the PDU session status information was in the Registration Request, AMF 306-a may indicate the PDU session status to the UE 215. AMF 306-a may include in the Registration Accept message a set of network slice identifiers that are accepted by the network, i.e., NSSAI includes the accepted S-NSSAIs.

For each UE requested network slice AMF 306-a checks if the UE requested slice is supported, or if alternative compatible slices are available. AMF 306-a creates builds a set of network slice identifiers that are accepted by AMF 306-a. The set may include slice identifiers requested by UE 215, as well as network identifiers for alternative compatible network slices. AMF 306-a may reject the registration procedure if the network is unable to provide slices that are compatible with the UE requested slices.

Finally, at 623, UE 215 sends a Registration Complete message to AMF 306-a to acknowledge if a new Temporary User ID was assigned.

Figure 7:
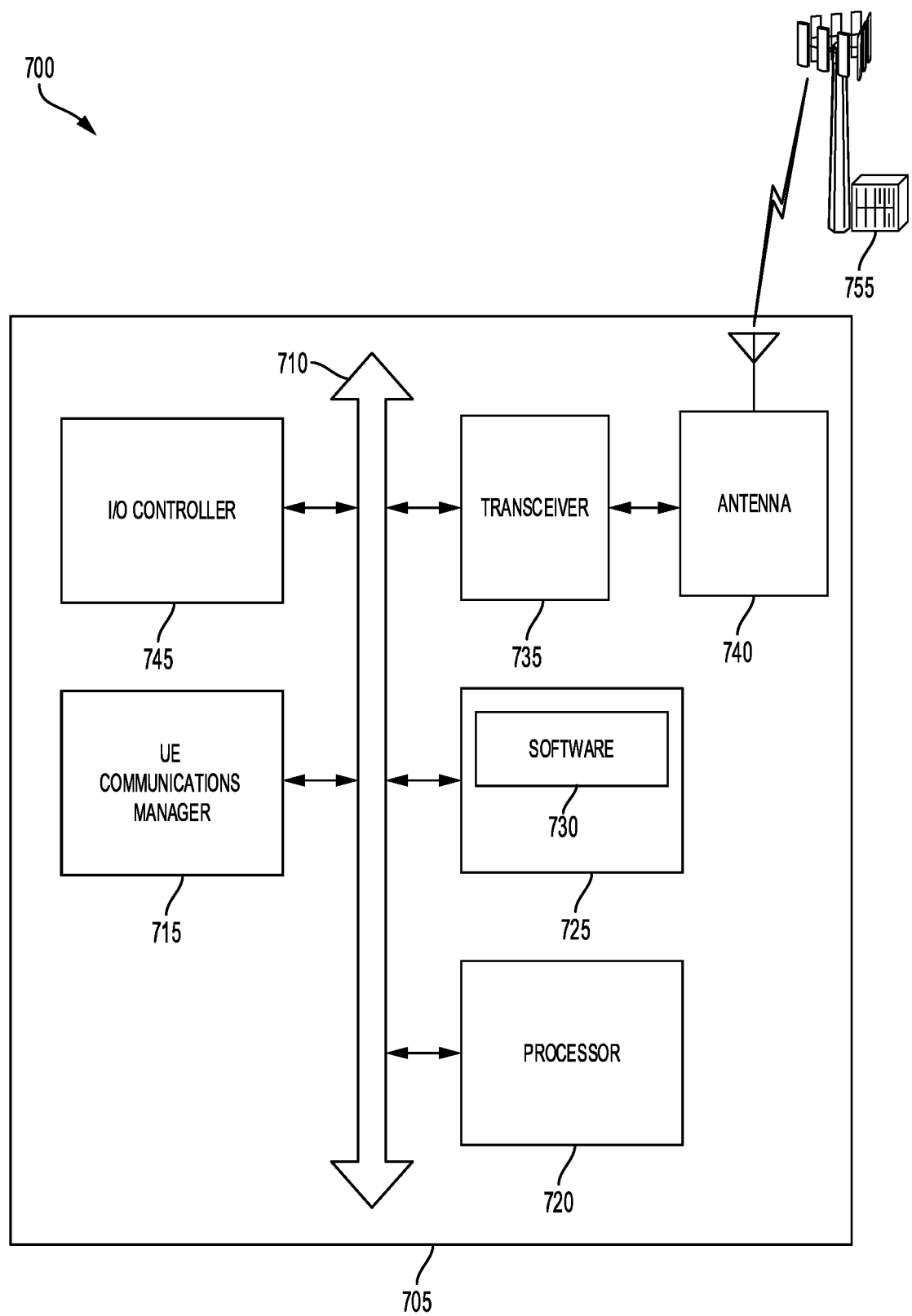
FIG. 7 is an exemplary block diagrams of a device implementing the techniques disclosed herein, in accordance with one or more aspects of the present disclosure.

FIG. 7 shows a diagram of a system 700 including a device 705 that supports using network slices to negotiate and select network services, in accordance with one or more aspects of the present disclosure. Device 705 may be an example of or include the components of wireless device 302, or UE 215 as described above, e.g., with reference to FIGS. 1, 6 and 7. Device 705 may include components for bi-directional voice and data communications including components for transmitting and receiving communications, including UE communication manager 715, processor 720, memory 725, software 730, transceiver 735, antenna 740, and I/O controller 745. These components may be in electronic communication via one or more busses (e.g., bus 710). Device 705 may communicate wirelessly with one or more network access devices 755.

Processor 720 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 720 may be configured to operate a memory array using a memory controller. In other cases, a memory controller may be integrated into processor 720. Processor 720 may be configured to execute computer-readable instructions stored in a memory to perform various functions (e.g., functions or tasks supporting network assisted multi-subscription physical layer sharing).

Memory 725 may include random access memory (RAM) and read only memory (ROM). The memory 725 may store computer-readable, computer-executable software 730 including instructions that, when executed, cause the processor to perform various functions described herein. In some cases, the memory 725 may contain, among other things, a basic input/output system (BIOS) which may control basic hardware and/or software operation such as the interaction with peripheral components or devices.

Software 730 may include code to implement aspects of the present disclosure, including code to support using network slices to negotiate and select network services. Software 730 may be stored in a non-transitory computer-readable medium such as system memory or other memory. In some cases, the software 730 may not be directly executable by the processor but may cause a computer (e.g., when compiled and executed) to perform functions described herein.

Transceiver 735 may communicate bi-directionally, via one or more antennas, wired, or wireless links as described above. For example, the transceiver 735 may represent a wireless transceiver and may communicate bi-directionally with another wireless transceiver. The transceiver 735 may also include a modem to modulate the packets and provide the modulated packets to the antennas for transmission, and to demodulate packets received from the antennas. In some cases, the wireless device may include a single antenna 740. However, in some cases the device may have more than one antenna 740, which may be capable of concurrently transmitting or receiving multiple wireless transmissions.

Figure 8:
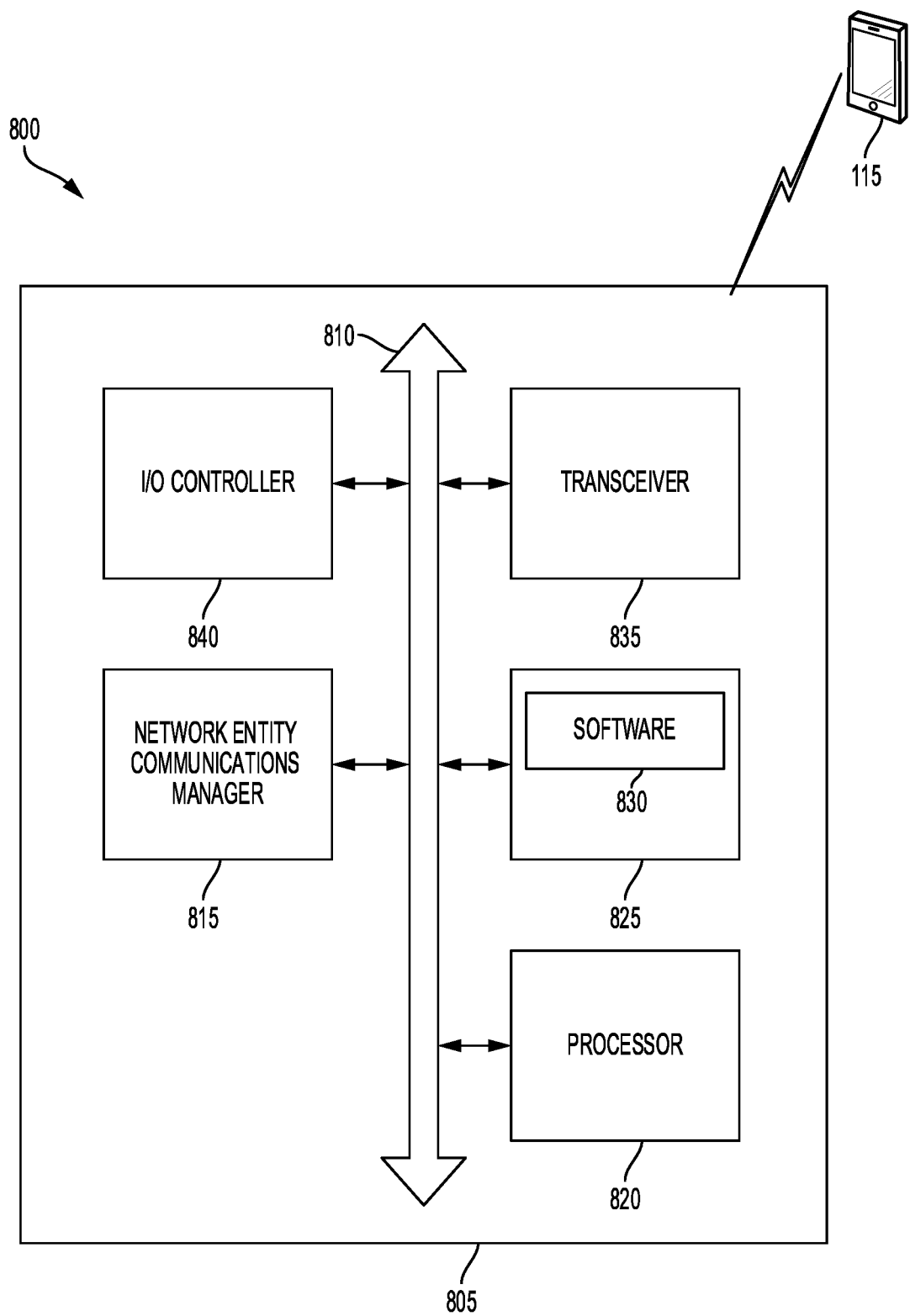
FIG. 8 illustrates a block diagram of a system including a core network entity in accordance with one or more aspects of the present disclosure.

FIG. 8 shows a diagram of a system 800 including a device 805 that supports network service configuration and selection using network slices in accordance with one or more aspects of the present disclosure. Device 805 may be an example of or include the components of a network entity (e.g., AMF 120) as described above, e.g., with reference to FIG. 2. Device 805 may include components for bi-directional voice and data communications including components for transmitting and receiving communications, including network entity communications manager 815, processor 820, memory 825, software 830, transceiver 835, and I/O controller 840. These components may be in electronic communication via one or more busses (e.g., bus 810).

Processor 820 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 820 may be configured to operate a memory array using a memory controller. In other cases, a memory controller may be integrated into processor 820. Processor 820 may be configured to execute computer-readable instructions stored in a memory to perform various functions (e.g., functions or tasks supporting NAS transport for non-mobility management messages).

Memory 825 may include RAM and ROM. The memory 825 may store computer-readable, computer-executable software 830 including instructions that, when executed, cause the processor to perform various functions described herein. In some cases, the memory 825 may contain, among other things, a software which may control basic hardware and/or software operation such as the interaction with peripheral components or devices.

Software 830 may include code to implement aspects of the present disclosure, including code to support network service configuration and selection using network slices. Software 830 may be stored in a non-transitory computer-readable medium such as system memory or other memory. In some cases, the software 1630 may not be directly executable by the processor but may cause a computer (e.g., when compiled and executed) to perform functions described herein.

Transceiver 835 may communicate bi-directionally, via one or more antennas, wired, or wireless links as described above. For example, the transceiver 835 may represent a wireless transceiver and may communicate bi-directionally with another wireless transceiver. The transceiver 835 may also include a modem to modulate the packets and provide the modulated packets to the antennas for transmission, and to demodulate packets received from the antennas. Transceiver 835 may also communicate with other network entities to provide and/or consume network slice services or functions.

Figure 9:
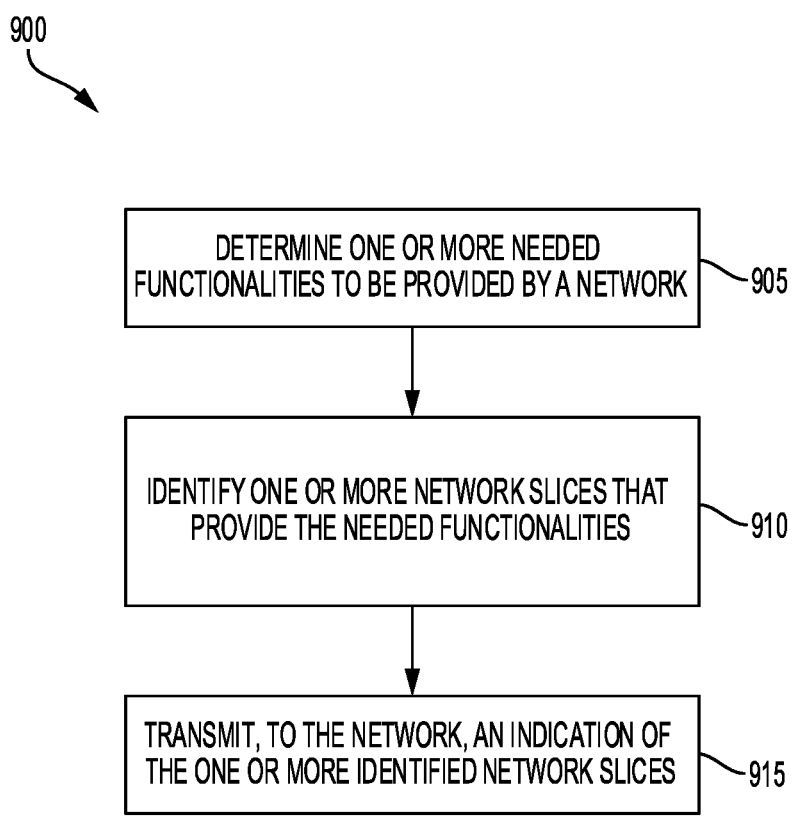
FIGS. 9 and 10 are illustrative process block diagrams of a technique for using network slices to negotiate and select network services, in accordance with one or more aspects of the present disclosure.

FIG. 9 shows a flowchart illustrating a method 900 for using network slice identifiers to negotiate and select network services, in accordance with one or more aspects of the present disclosure. The operations of method 900 may be implemented by a UE 215 or its components as described herein. For example, the operations of method 900 may be performed by a UE communication manager as described with reference to FIGS. 2 and 7. In some examples, a UE 215 may execute a set of codes to control the functional elements of the device to perform the functions described below. Additionally or alternatively, the UE 215 may perform aspects of the functions described below using special-purpose hardware.

At block 905, the UE 215 may determine one or more needed functionalities to be provided by a network. In some examples, the determination may be done by search a data structure for functionalities needed for an application to be executed on UE 215. In some aspects, the data structure may be a list, table, or database. In other examples, the determination may be hard coded. The operations of block 905 may be performed according to the methods described with reference to FIGS. 6 through 9.

At block 910, the UE 215 may identify one or more network slices that provide the needed functionalities. In some aspects, this may be done by looking up an application to be run in a data structure mapping applications so slice identifiers. In other aspects, this may be done by first mapping an application to a set of desired features or functionalities and then search a database or other data structure for one or more matching slices. The data may be pre-supplied by a network operator to UE 215. In other examples, applications on UE 215 may provide their own data for mapping the application to a set of network features and/or a network slice identifier. At block 915, the UE 215 may transmit, to the network, an indication of the one or more identified network slices. The operations of block 915 may be performed according to the methods described with reference to FIGS. 3 and 7.

Figure 10:
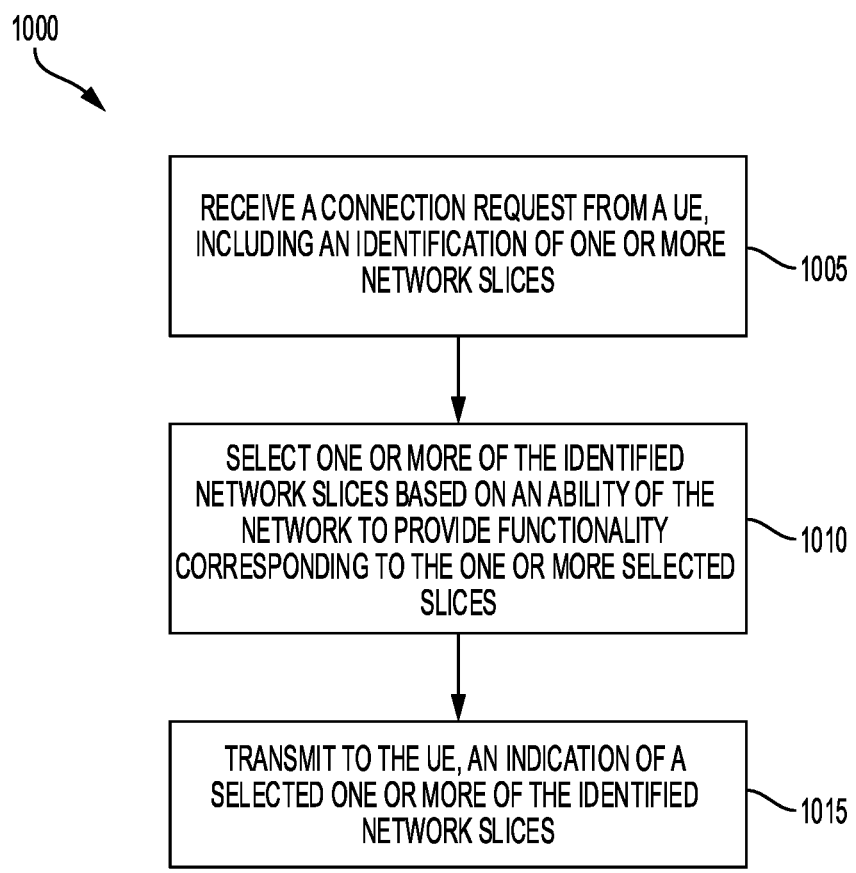

FIG. 10 shows a flowchart illustrating a method 1000 for network service configuration and selection using network slices in accordance with one or more aspects of the present disclosure. The operations of method 1000 may be implemented by a network entity (e.g., AMF 120) or its components as described herein. For example, the operations of method 1000 may be performed by a network entity communications manager as described with reference to FIG. 8. In some examples, a network entity may execute a set of codes to control the functional elements of the device to perform the functions described below. Additionally or alternatively, the network entity may perform aspects of the functions described below using special-purpose hardware.

At block 1005, the network entity may receive a connection request from a UE, including an identification of one or more network slices. The operations of block 1805 may be performed according to the methods described with reference to FIGS. 1 through 8.

At block 1810, the network entity may select one or more of the identified network slices based on an ability of the network to provide functionality corresponding to the one or more selected slices received from the UE. The operations of block 1810 may be performed according to the methods described with reference to FIGS. 1 through 8.

At block 1815, the network entity may transmit to the UE, an indication of a selected one or more of the identified network slices. However, if the network is unable to support slices identified by the UE, the network may transmit an indication of a compatible slice. Alternatively, the network may refuse the connection request. The operations of block 1815 may be performed according to the methods described with reference to FIGS. 1 through 8. In certain examples, aspects of the operations of block 1815 may be performed by a payload type manager as described with reference to FIGS. 13 through 16.

It should be noted that the methods described above describe possible implementations, and that the operations and the operations may be rearranged or otherwise modified and that other implementations are possible. Furthermore, aspects from two or more of the methods may be combined.

Techniques described herein may be used for various wireless communications systems such as CDMA, TDMA, FDMA, OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP LTE and LTE-Advanced (LTE-A) are releases of Universal Mobile Telecommunications System (UMTS) that use E-UTRA. UTRA, E-UTRA, UMTS, LTE, LTE-A, NR, and Global System for Mobile communications (GSM) are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. 5G NR uses the term next generation node B (gNB). The wireless communications system or systems described herein may include a heterogeneous LTE/LTE-A or NR network in which different types of evolved node B (eNBs) provide coverage for various geographical regions. For example, each eNB, gNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), next generation NodeB (gNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communication system 200 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary operation that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed:

1. A method for wireless communication by a user equipment (UE):
    identifying a set of network slices that collectively provide functionalities needed by the UE;
    determining a network slice identifier for each network slice in the set; and
    transmitting, to the network, an indication of the determined network slice identifiers for the identified set of network slices.

2. The method of claim 1, wherein identifying further comprises:
    determining one or more functionalities needed by the UE to be provided by a network; and
    comparing the one or more functionalities needed by the UE with functionalities provided by each network slice in a set of slices.

3. The method of claim 2 wherein the UE is provisioned with data detailing functionalities provided by each one of a set of network slices, and comparing comprises comparing the one of more needed functionalities with the provisioned data.

4. The method of claim 2, wherein determining one or more functionalities needed by the UE further comprises distinguishing functionalities that are required from functionalities that are preferred.

5. The method of claim 4, wherein comparing the one or more functionalities needed by the UE with functionalities provided by each network slice further comprises comparing whether a functionality is required or preferred.

6. The method of claim 5, wherein transmitting, to the network, an indication of the one or more identified network slices further comprises indicating which of the network slices are preferred.

7. The method of claim 1, wherein identifying comprises mapping an application executing on the UE to a set of two or more network slices.

8. The method of claim 2, wherein the network slice identifier comprises a Network Slice Selection Assistance Information (NSSAI), including a Slice/Service Type (SST).

9. The method of claim 8, wherein the NSSAI further includes a Slice Differentiator (SD).

10. The method of claim 9, further comprising distinguishing network slices that are required from those that are preferred.

11. Apparatus for wireless communication comprising:
    a transceiver;
    a memory; and
    a processor, in electrical communication with the transceiver and the memory, configured to determine a set of desired network provided functionalities;
        identify a set of two or more network slices collectively providing the functionalities in the set of desired network functionalities;
        determine a network slice identifier for each of the network slices in the set; and
        communicate, to a network, an indication of the determined network slice identifiers.

12. The apparatus of claim 11, further configured to identify the set of network slices by comparing the set of desired functionalities to preconfigured data associating network provided functionalities with network slice identifiers.

13. The apparatus of claim 11, further configured to identify a set of one or more optional functionalities.

14. The apparatus of claim 11, further configured to identify the set of two or more network slices by identifying two or more network slices having functionalities collectively matching the desired functionalities.

15. The apparatus of claim 11, wherein each one of the set of desired network provided functionalities is one of an end-to-end feature or a range of values for a parameter.

16. The apparatus of claim 11 further configured to receive from the network an indication of the network slices to be provided by the network, an indication an alternative compatible set of network slices to be provided by the network, or an indication of a rejection.

17. Apparatus for wireless communication comprising:

means for determining a set of network provided functionalities needed by the apparatus;

means for identifying a set of two or more network slices that collectively provide the functionalities needed by the apparatus;

means for determining a network slice identifier for each network slice in the set; and means for communicating with the network, to send an indication of the determined network slice identifiers of the set of two or more identified network slices.

18. The apparatus of claim 17, further comprising:

means to determine one or more functionalities needed by the apparatus, which functionalities are to be provided by a network; and means to compare the one or more functionalities needed by the apparatus with functionalities provided by each network slice in a set of slices.

19. The apparatus of claim 18 wherein the apparatus is provisioned with data detailing functionalities provided by each one of a set of network slices, and the means for comparing comprises means for comparing the one or more needed functionalities with the provisioned data.

20. The apparatus of claim 19, further comprising means for distinguishing functionalities that are required from functionalities that are preferred, and wherein the means for communicating with the network, further comprises means for indicating which of the network slices are preferred.

21. The apparatus of claim 17, wherein the means for identifying comprises means for mapping an application executing on the UE to a set of one or more network slices.

22. The apparatus of claim 17, wherein the means for identifying one or more network slices that provide functionalities needed by the apparatus comprises, means for determining a network slice identifier corresponding to each network slice that provides the needed functionalities.

* * * * *